United States Patent
Suchak et al.

(10) Patent No.: US 7,632,475 B2
(45) Date of Patent: Dec. 15, 2009

(54) PROCESS FOR REMOVING CONTAMINANTS FROM GAS STREAMS

(75) Inventors: Naresh Suchak, Glen Rock, NJ (US);
Steven Joseph Finley, Wayne, NJ (US);
Joseph A. Eschbach, Bridgewater, NJ (US); Robert Aeiss, South Plainfield, NJ (US)

(73) Assignee: Linde, Inc., Murray Hill, NJ (US)

( * ) Notice: Subject to any disclaimer, the term of this patent is extended or adjusted under 35 U.S.C. 154(b) by 150 days.

(21) Appl. No.: 11/971,948

(22) Filed: Jan. 10, 2008

(65) Prior Publication Data
US 2008/0175777 A1    Jul. 24, 2008

Related U.S. Application Data

(60) Provisional application No. 60/897,003, filed on Jan. 23, 2007.

(51) Int. Cl.
*B01D 46/00* (2006.01)
*B01D 53/50* (2006.01)
*B01D 53/56* (2006.01)
*C01B 17/69* (2006.01)

(52) U.S. Cl. ............ 423/210; 423/215.5; 423/235; 423/522; 423/523

(58) Field of Classification Search ......... 423/210, 423/215.5, 235, 522, 523
See application file for complete search history.

(56) References Cited

U.S. PATENT DOCUMENTS

| | | | |
|---|---|---|---|
| 4,029,739 A | 6/1977 | Senjo et al. | |
| 4,035,470 A | 7/1977 | Senjo et al. | |
| 4,120,669 A * | 10/1978 | Amendola | 423/244.1 |
| 4,351,810 A * | 9/1982 | Martinez et al. | 423/235 |
| 4,692,318 A * | 9/1987 | Tolpin et al. | 423/239.1 |
| 6,117,403 A * | 9/2000 | Alix et al. | 423/210 |
| 6,174,510 B1 * | 1/2001 | Riano | 423/522 |

FOREIGN PATENT DOCUMENTS

EP      1 332 786 A2    8/2003

* cited by examiner

*Primary Examiner*—Timothy C Vanoy
(74) *Attorney, Agent, or Firm*—Philip H. Von Neida

(57) ABSTRACT

The present invention provides for process for inhibiting the levels of nitrogen oxides in process gas streams from sulfuric acid regeneration and production plants. The process gas stream from the waste heat boiler and the candle mist eliminator is contacted with ozone which will react with nitrogen oxides present in the flue gas.

35 Claims, 4 Drawing Sheets

PROCESS FOR REMOVING CONTAMINANTS FROM GAS STREAMS

The present application claims priority from U.S. Provisional Patent Application 60/897,003 filed Jan. 23, 2007.

BACKGROUND OF THE INVENTION

The present invention provides for processes for removing contaminants from gas stream emissions. More particularly, the present invention provides for removing contaminants such as nitrogen oxides from gas streams in sulfuric acid production processes.

Sulfuric acid is used in a wide spectrum of process industries. Sulfuric acid is believed to be the world's largest chemical produced. Over past few decades, worldwide, most of the sulfuric acid is produced by a contact process, which involves generating a sulfur dioxide containing gas stream from variety of sulfur sources. Examples include burning elemental sulfur, or process of roasting metal ore or burning $H_2S$ arising from industrial operations such as hydrodesulfurization of petroleum products or simply burning waste containing sulfate or sulfuric acid or combusting spent sulfuric acid all generate $SO_2$ in the gas stream. If the source of sulfur is dirty, flue gas is conditioned and oxidized to convert almost all $SO_2$ to $SO_3$ over a $V_2O_5$ catalyst in a multi pass converter. The oxygen required for oxidation is either present or supplemented in the form of additional air or oxygen. This $SO_3$ containing gas stream is absorbed in sulfuric acid solution, which results in the $H_2SO_4$ product as a >95% wt acid or oleum of desired strength.

Since sulfuric acid is a very low cost product, and reactions are exothermic, heavy emphasis is put on heat integration and therefore generally most exothermic heat that is recovered is used within the process for captive requirement of energy and any net surplus is exported in the form of steam. Nitrogen oxides ($NO_X$) are generally formed during the $SO_2$ generation step in varying quantities based on a variety of factors. When an $SO_3$ containing gas stream is absorbed into sulfuric acid solution, some of the $NO_X$ reacts with a circulating solution of sulfuric acid forming a complex which is referred in industry as niter (nitrosyl sulfuric acid) and some of its homologs. Niter in the product is an undesirable impurity in many applications and also imparts some color to the product.

Some of the $NO_X$ which leaves the scrubber passes through much of the process equipment and is finally exhausted to the environment. It is often noted that the plume arising from the sulfuric acid production facility is correlated with SOx emissions, $NO_X$ emissions, niter, types of mist eliminating devices and various process parameters. Some of these environmental problems are alleviated in the modern plant by a dual stage absorption process, choosing effective mist elimination devices followed by a caustic scrubber. Selective catalytic reduction (SCR), selective non-catalytic reduction (SNCR) type of processes have been suggested for $NO_X$ removal. However, the problems of $NO_X$ emissions, acid plume, deterioration of product quality due to niter and nitrogen containing compounds in sulfuric acid still exists at varying levels in the industry. With increasing environmental concern and government oversight, the present levels of $NO_X$ controls are not adequate.

Sulfuric acid is a high production volume but a low cost and low margin chemical. The cost of a plant producing sulfuric acid is relatively high. The relationship of the capital cost and the plant capacity is not linear. Therefore, plants with a larger production capacity achieve much better scales of economy compared to plants with smaller capacities. Sulfuric acid is a highly reactive chemical and therefore transporting it over long distance is not only expensive but also increasingly hazardous. For a smaller plant operator, it makes good economic sense to boost the capacity of sulfuric acid by employing oxygen enrichment in the $SO_2$ generation and or oxidation stage.

Oxygen enrichment when done to the $SO_2$ generation stage, not only increases throughput, but also can improve thermal efficiency thereby reducing fuel requirements, increasing $SO_2$ concentration in the process gas stream, and exporting more steam and reducing unit product cost. Replacing some of the combustion/oxidation air with gaseous oxygen not only improves capacity of the furnace but also increases $SO_2$ content of the process gas stream exiting the furnace. Generally downstream equipment such as catalytic converters, waste heat recovery equipment, fans, etc. operate more effectively at higher concentration of $SO_2$ and lower process gas flow rates. Typical sulphuric acid processing equipment has adequate processing capacity to handle 30 to 40% additional $SO_2$ load. In the case when $SO_2$ is arising from a metal roasting furnace, oxygen enrichment not only improves sulfuric acid throughput but also enhances ore processing capacity.

With all these positive aspects of oxygen enrichment with respect to capacity and costing, there is a major down side. Oxygen enrichment produces higher combustion temperatures in the furnace with greater $O_2$ concentration resulting in higher amount of $NO_X$ formation. Without addressing issues regarding higher environmental emissions and increased niter content of the product, full potential or benefits of oxygen enrichment can not be achieved. FIG. 1 depicts the difficulty in economically justifying smaller size plants due to longer payback period. However with $O_2$ enrichment, this payback period can be significantly reduced.

SUMMARY OF THE INVENTION

The present invention provides for a method for removing contaminants from a waste gas stream in a sulfuric acid production process comprising the steps:
 a) contacting said waste gas stream with ozone;
 b) directing said waste gas stream to a particulate scrubber;
 c) directing said waste gas stream to a gas dryer; and
 d) recovering said waste gas stream.

The present invention also provides for a method for removing contaminants from a gas stream from a candle mist eliminator in a sulfuric acid production process comprising the steps:
 a) contacting said gas stream with ozone;
 b) directing said gas stream to an environmental scrubber; and
 c) recovering said gas stream.

The present invention further provides for a method for producing sulfuric acid comprising the steps:
 a) recovering a gas stream from a sulfuric acid recovery furnace;
 b) directing said gas stream to a particulate scrubber;
 c) injecting ozone into said gas stream prior to it entering said particulate scrubber;
 d) directing said scrubbed gas stream to a gas drying tower;
 e) directing said dried, scrubbed gas stream to a catalyst bed to convert sulfur dioxide present in said dried, scrubbed gas stream to sulfur trioxide;
 f) directing said gas stream containing sulfur trioxide to a sulfuric acid absorption tower; and
 g) recovering sulfuric acid.

The invention relates to de-bottle-necking capacity of sulfuric acid production plant particularly when $SO_2$ gas is derived from sources other than elemental sulfur. Examples of $SO_2$ gas derived from sulfur sources are:

1.) Metal ore processing furnace where $SO_2$ is produced as a result of the reaction between Metal sulfide and Oxygen.

$$MS + 2\ O_2 \rightarrow MO_2 + SO_2$$

2.) $H_2S$ generated by refinery processes $$2\ H_2S + 3O_2 \rightarrow 2\ SO_2 + 2\ H_2O$$

3.) Sulfate containing waste or spent sulfuric acid furnace $$SO_4 \rightarrow SO_2 + O_2$$

$$2\ H_2SO_4 \rightarrow 2\ SO_2 + 2\ H_2O + O_2$$

The spent sulfuric acid stream is generally weak or contaminated sulfuric acid which often has water and some by-products of the main reaction and needs to be purged. One of the major sources of spent sulfuric acid is the alkylation process of refinery gas where $C_4$ (butenes, isobutenes) containing gas stream is subjected to an alkylation reaction to produce iso-octane containing petroleum feedstock. Other important processes that use sulfuric acid are esterification, nitration, oxidation, and sulfonation of organic molecules. Some specific examples where the spent sulfuric acid stream is purged in manufacturing are production of oxalic acid, Nylon 66 (adipic acid), and dioctyl, diethyl, dimethyl phthalates, etc.

Although theoretically most of the spent sulfuric acid can be regenerated, economically it makes sense to recover sulfuric acid from streams that are generated in large quantities with low water content; especially where cheaper means of disposal or treatment are not viable or practical.

There are a number of methods to remove, reduce and prevent $NO_X$ formation in sulfuric acid regeneration and production systems. Most of these methods are either not very effective, are capital intensive, complicated and/or require significant amount of energy.

The present invention provides for a novel approach to removal of $NO_X$ at two different locations based on the required needs of the plant operator. If the primary need is to reduce niter content of the product sulfuric acid, the first option is more suitable and if the $NO_X$ in the flue gas in the stack is the concern, the second option may be an optimal choice.

In both options, ozone is injected into the gas stream to oxidize insoluble $NO_X$ to highly soluble oxides of nitrogen.

$$NO + O_3 \rightarrow NO_2 + O_2$$

$$NO_2 + O_3 \rightarrow NO_3 + O_2$$

$$NO_3 + NO_2 \rightarrow N_2O_5$$

$N_2O_5$ is very soluble compared to $NO_2$ and NO and therefore can be very easily scrubbed with water.

$$N_2O_5 + H_2O \rightarrow 2\ HNO_3$$

Ozone is generated on site and as needed by using up to 25 psig dry instrument air to produce 2.7% by wt ozone or 93% or higher purity oxygen to produce 10% by wt or higher concentration ozone.

In the second option, the environmental scrubber not only removes NOx, but also is intended to remove unconverted $SO_2$. Therefore, the scrubbing solution consists of sodium hydroxide or carbonate solution. Absorption of $SO_2$ in the sodium carbonate or hydroxide solution forms sodium sulfite and bisufite in situ.

$$SO_2 + NaOH \rightarrow NaHSO_3$$

$$NaHSO_3 + NaOH \rightarrow Na_2SO_3 + H_2O$$

The presence of sulfite is essential in Option 2 to deplete excess ozone if NOx concentration in the treated gas stream is to be reduced below 20 PPM by volume. Unreacted ozone in the scrubber is depleted in the following reaction:

$$Na_2SO_3 + O_3 \rightarrow Na_2SO_4 + O_2$$

In addition to Ozone oxidizing Sulfite, oxygen present in the gas stream also oxidizes sulfite in the scrubbing solution to sulfate.

$$2\ Na_2SO_3 + O_2 \rightarrow Na_2SO_4$$

$NO_2$ in the gas stream also is known to deplete sulfite in the aqueous stream. Therefore, if ozone emission via the treated gas stream to the stack is a concern, supplementary sulfite may be added to the environmental scrubber. Sodium thiosulfite or reduced sulfur may be added in the environmental scrubber to maintain the required level of sulfate for depletion of ozone.

DETAILED DESCRIPTION OF THE INVENTION

A Sulfuric Acid Regeneration (SAR) plant and acid recovery system on a metal ore roaster furnace is a slightly modified form of a sulfur burning sulfuric acid plant. In all three types of plants, a source of sulfur is converted to $SO_2$ in the process gas. In the first two types of plants, $SO_2$ containing streams have particulate matter and need to be washed and dried prior to oxidizing to $SO_3$. The clean and dry $SO_2$ containing stream is passed through a series of heat exchangers and beds of $V_2O_5$ catalyst to convert it to $SO_3$ at about 700° C. Typically 3 to 4 catalyst beds called converters are used. The heat from the process gas stream exiting the final converter bed is used in heating the gas entering the converter by series of cascaded heat exchanger. $SO_3$ is absorbed in the sulfuric acid absorber to form oleum or 98% sulfuric acid and some product is continuously removed.

In the newer sulfuric acid plants, the flue gas stream from the absorber is again heated and passed through a $V_2O_5$ bed to oxidize residual amounts of $SO_2$ and then subjected to another absorber to remove almost all of sulfur as $SO_3$. The exhaust gas from the 2nd absorber is passed through a candle mist eliminating device to remove $H_2SO_4$ mist and finally scrubbed with caustic soda in an environmental scrubber before exhausting through the stack. Environmental scrubbers are not always employed and mostly configured in the train to meet the local regulations governing $SO_2$ emissions.

Figure 3:
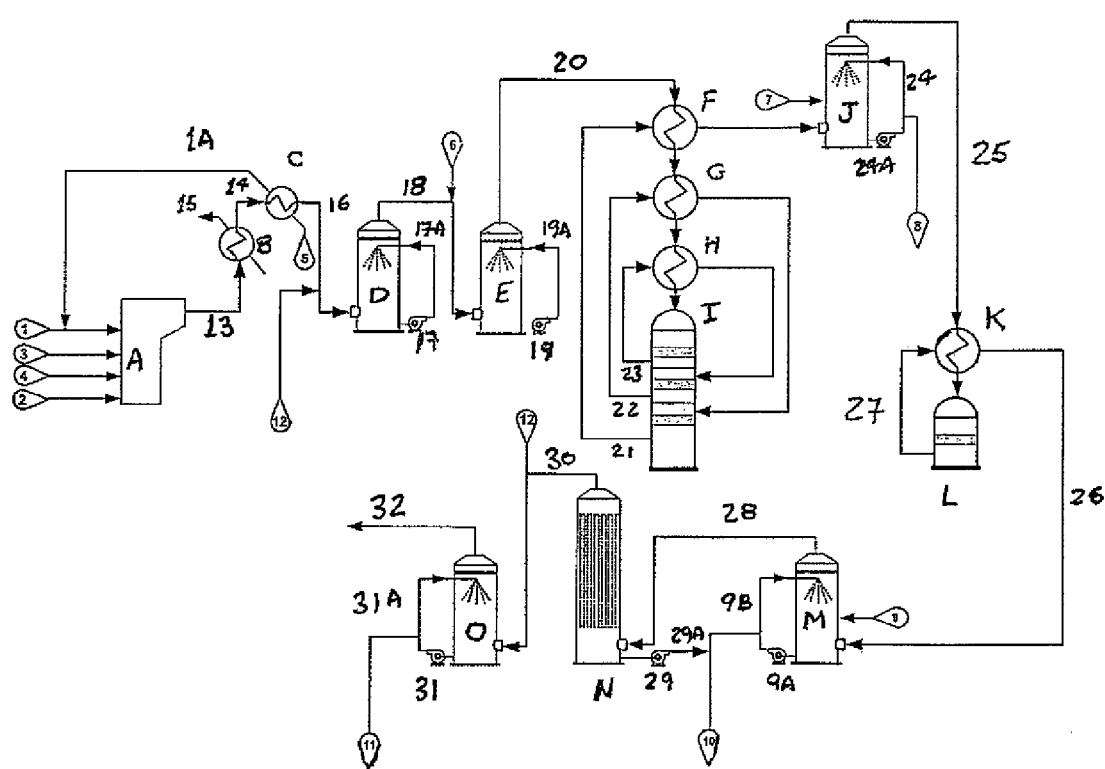
FIG. 3 is a schematic representation of a sulfuric acid regeneration (SAR) process integrated with the $NO_X$ reduction schemes per the present invention.

The main difference between a traditional sulfur burning sulfuric acid and an acid recovery or SAR unit is how the sulfur source is converted to $SO_2$. A SAR unit as shown in FIG. 3 uses a furnace to convert spent sulfuric acid to $SO_2$. Since decomposition of $H_2SO_4$ is endothermic and favored by raising the temperature, natural gas or hydrocarbon feedstock is required to raise temperature of the furnace. Generally finely atomized sulfuric acid is held at 650° C. or higher for a sufficient time to obtain 99.5 % conversion. A supplemental feed stream of $H_2S$ can be fed to this furnace for three primary reasons, 1) $H_2S$ has a calorific value 2) it is a good source of sulfur and 3) there is a monetary benefit in taking care of $H_2S$. The exhaust from SAR furnace, in addition to $SO_2$, has other contaminants, such as fly ash, etc. After recovering the heat in the waste heat boiler, the exhaust gas is around 110° C. to 126° C. This process gas is subjected to an aqueous wash to remove particulate matter, fly ash and other impurities. The gas is then dried by scrubbing with sulfuric acid and forwarded to a series of heat exchangers and converters.

In a conventional sulfuric acid plant, molten elemental sulfur is burnt in a furnace to form sulfur dioxide. In contrast to SAR, $SO_2$ produced from elemental sulfur is relatively free from dust, fly ash and other contaminants and does not require "washing" or scrubbing. The $SO_2$ containing gas stream from the furnace can be directly led to series of waste heat boilers, converters and heat exchangers. Therefore sulfur burning sulfuric acid plants export as much as 1.4 tons of steam per ton of sulfuric acid produced.

Some $NO_X$ is always produced in furnaces where $SO_2$ is generated. The sulfuric acid decomposition reaction in the SAR process, in particular, is favored by higher furnace temperature which in turn causes some of the nitrogen to convert to nitric oxide in the furnace. Some organic nitrogen content in the spent sulfuric acid converts to nitric oxide in the furnace. To assure adequate destruction of organic contamination in spent sulfuric acid, a certain residence time is required at furnace temperature. To increase SAR unit throughput (up to 30%) the furnace is often supplemented with pure oxygen stream. All these lead to formation of $NO_X$ in the furnace.

$NO_X$ formed consists mainly of NO and $NO_2$. Both nitric oxide (NO) and nitrogen dioxide ($NO_2$) are sparingly soluble gases. They are not significantly removed in the particulate scrubbers and pass along with process gas through converters to the sulfuric acid absorber. Some of the NO reacts with the sulfuric acid and forms nitrosyl sulfuric acid "niter" and imparts a violet coloration to the sulfuric acid product. Industrial sulfuric acid users are sensitive to concentrations of "nitrogen" or "niter" in the sulfuric acid. The exhaust from the sulfuric acid absorber still has an equilibrium concentration of NO, some of which further condenses in the candle mist eliminator as niter. Finally the remainder of NO exits the sulfuric acid plant with exhaust gas which is emitted to the atmosphere via the stack.

Figure 1:
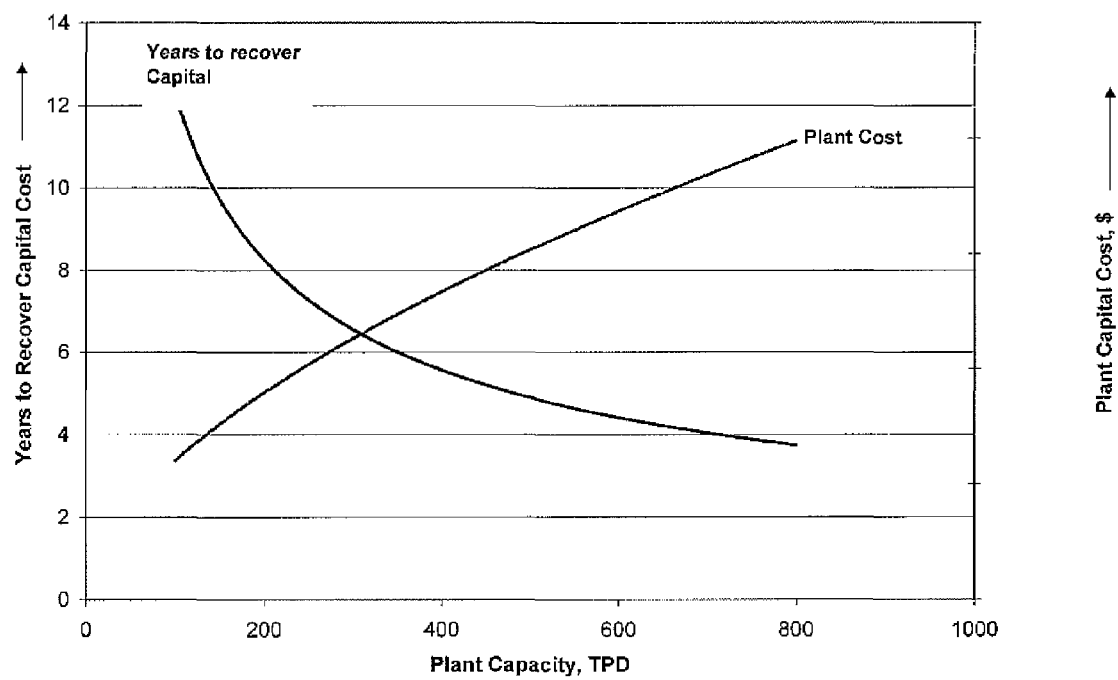
FIG. 1 is a graph representing plant capacity versus years to recovery for capital cost.
Figure 2:
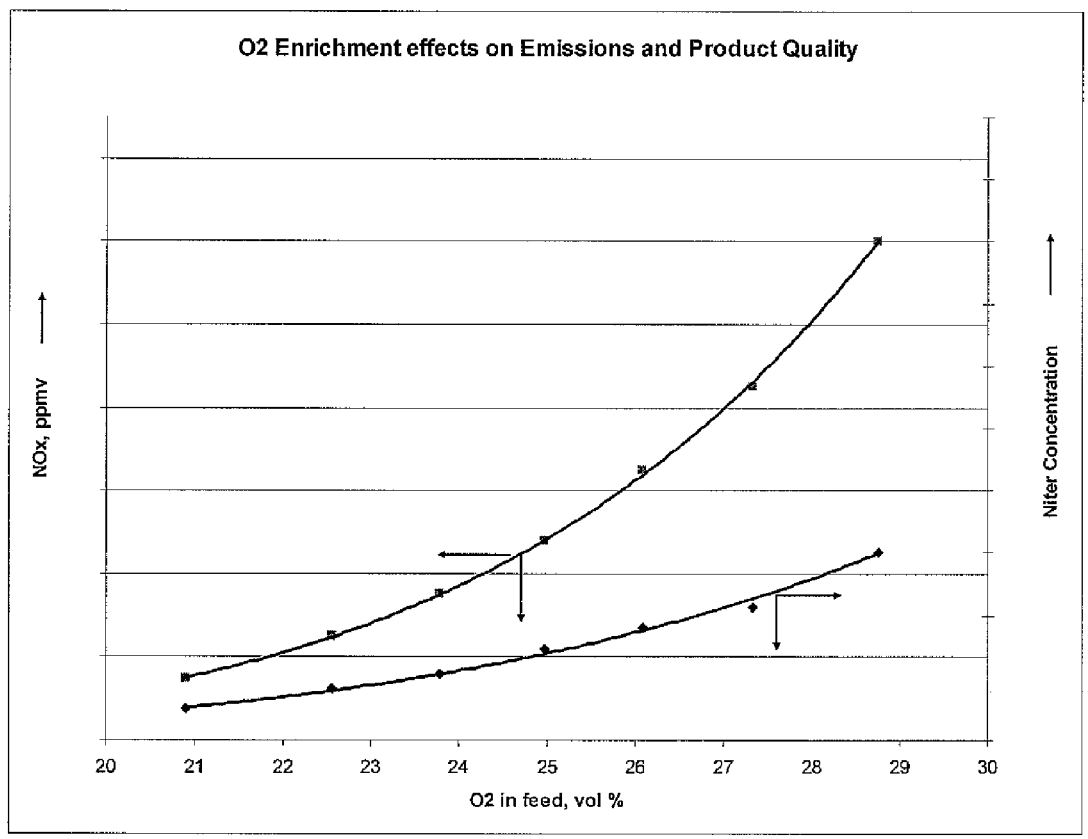
FIG. 2 is a graph showing the increase in $NO_X$ and niter as oxygen content in the feed increases.

In order to increase the production capacity in the existing SAR furnace or metal ore kiln, the feed air can be supplemented with oxygen. FIG. 2 depicts the effect of $O_2$ enrichment on stack emissions and product quality. As shown in FIG. 2 with an increase in $O_2$ concentration in the feed, $NO_X$ content in the flue gas through stack rapidly increases and so does the niter content of the product acid.

Therefore it is very likely that the enrichment that provides up to 30% more throughput can cause issues with the environment and product quality. In addition, although exact reasons are not known but higher niter content in the product acid is also associated with visible plume at the stack.

Many geographical regions in the United States such as the North-East, Houston-Galveston and California regions fall under ozone non-attainment area rules and regulations. The control of $NO_X$ emissions is a primary concern for local, state and federal environmental protection authorities.

The Clean Air Act of 1990 and the Interstate Air Quality Rules (IAQR) mandate the USEPA, state and local air-quality management authorities to implement tougher standards to improve air quality. Most existing refineries that generate spent sulfuric acid are on the east coast, gulf coast and along the west coast of the United States. The amount of spent sulfuric acid generated by an individual refinery is not large enough for an economically viable SAR unit. Therefore a separate unit that can process spent sulfuric acid streams from more than one refinery is more preferable. Such a unit becomes a new and independent source and therefore is outside the bubble permit of any one refinery.

Sulfuric acid is a very low value commodity and is hazardous cargo to haul. There is also increasing pressure on refineries to reduce sulfur content of liquid fuels (diesel). It is therefore of interest to set up a spent sulfuric acid plant in the vicinity of refineries where spent and product sulfuric acid can be exchanged via pipeline. In addition, SAR units can also advantageously process additional amounts of $H_2S$ generated by these refineries. However, such a location as mentioned above invites close scrutiny in environmental permitting and mandates industry to pursue gas pollution control devices that meet MACT standards.

Turning to FIG. 3, a furnace A is fed through line 1 with fuel gas. Spent acid is fed through line 2 and oxygen and hydrogen sulfide are fed through lines 3 and 4 respectively. Waste gas from the furnace A will leave through line 13 and enter waste heat boiler B. Steam from the waste heat boiler B will exit through line 15. The cooler waste gas exits waste heat boiler B through line 14 and enters air heater C which is fed air through line 5. Hot air from the air heater C will also be directed through line 1A into line 1 for the fuel gas being fed to the furnace. In an alternate configuration lines 3 and lines 4 can be also directed into line 1.

The waste gas stream will leave air heater C through line 16 and be directed into the particulate scrubber D. The first option of the present invention begins here with the introduction of ozone through line 16 such that the waste gas stream and ozone are mixed together prior to the waste gas stream entering the particulate scrubber D. If the waste gas temperature entering the particulate scrubber D exceeds 135° C., flue gas may be quenched prior to mixing with ozone. The scrubbed gas stream will exit the particulate scrubber through line 18. The scrubbing solution is pumped out of particulate scrubber D through pump 17 and directed into the spray header assembly through line 17A.

The wet gas stream in line 18 has air injected into it through line 6 and this stream now enters the gas drying tower E. The solution used in the gas drying tower E (generally $H_2SO_4$) is pumped out through pump 19 and reenters the tower via liquid distributor through line 19A. Some circulating $H_2SO_4$ from this tower is exchanged with Sulfuric Acid absorption tower J. This circuit is not depicted in the diagram. Dry gas leaves the gas drying tower E through line 20 and this gas stream is at about 65° C. This dry gas stream will enter a series of heat exchangers, in this example F, G and H respectively through line 20 before entering the converter I. Converter I has through separate converters present therein containing catalytic materials which will convert the clean and dry sulfur dioxide gas stream entering the converter I into sulfur trioxide.

The sulfur trioxide generated by the catalytic conversion will exit the converter I through line 23 and be directed to the first heat exchanger H where it will be cooled and reenter the converter I at a point lower than when it was removed. The same holds true with sulfur trioxide withdrawn through line 22 where it will enter the second heat exchanger G and reenter the converter I at a point lower than where it was removed. Lastly the converted sulfur trioxide is withdrawn from the bottom of the converter I through line 21 and will pass through the third heat exchanger before it enters the sulfuric acid absorption tower J. The heat exchange system may also have the provision to produce steam. Oxidation of $SO_2$ to $SO_3$ is highly exothermic and occurs at high temperatures in industrial applications. Normal practice is to carry it out in the temperature range in excess of 550° C. There are many configurations practiced in meaningful recovery and use of heat. The present invention is applicable to all the configurations. For the sake of brevity we have described only one of them in this example.

Sulfuric acid is fed into the sulfuric acid absorption tower through line 7 and the absorbing solution will exit through pump 24 through line 24A which feeds the absorbing solution into the liquid distributor at the top of the sulfuric acid absorption tower J. Oleum or sulfuric acid as product is withdrawn through line 8. The gas stream which has much of its sulfuric acid content removed will leave the absorption tower J through line 25 and enter the final heat exchanger K before entering the final converter L. The final converter L will contain catalytic material which will again convert any residual sulfur dioxide into sulfur trioxide.

The gas stream exiting the converter which now contains little sulfur dioxide is directed through line 26 into the final sulfuric acid absorption tower M. Sulfuric acid is circulated into this tower. The scrubbing solution (sulfuric acid) is recovered through pump 9A and fed back to the liquid distributor through line 9B. Some sulfuric acid (product) is also withdrawn from 9A via line 10. A sulfuric acid solution is added to absorption Tower M through line 9. The scrubbed gas will leave the final sulfuric acid absorption tower through line 28 and will enter the candle mist eliminator N. The candle mist eliminator N will contain mesh or other gas filtering devices to separate the gas mixture entering the eliminator which contains sulfur dioxide, some sulfuric acid, nitrogen oxides, carbon dioxide and oxygen and nitrogen. The residual sulfuric acid which is separated from the gas mixture will leave the candle mist eliminator through pump 29 and be directed into feed line 10. Sometimes, the collection from the mist eliminator is not mixed with the product acid (in line 10) and separately processed as it may have higher concentration of niter.

The separated gas stream which still contains nitrogen oxides will leave the candle mist eliminator N through line 30. Ozone is injected into this line through line 12 so that it mixes with the gas stream containing the nitrogen oxides before entering the environmental scrubber O. The ozone injection spot in the line 30 is so chosen as to provide adequate residence time for ozone to mix and oxidize NOx prior to entering the Scrubber O. Ozone is injected via nozzle(s) or perforated tube to ensure thorough mixing within bulk of the gas stream.

In the scrubber O the solution will scrub the nitrogen oxides and sulfur oxides remaining in the gas mixture. Scrubber solution is drawn from the environmental scrubber O through pump 31 and bled from the system through scrubber bleed line 11. What solution is not bled off is directed back into the environmental scrubber O into its spray headers through line 31A. The gas that is now substantially free of nitrogen oxides and sulfur oxides will leave the environmental scrubber O through line 32 to be directed to the stack. The pH of the environmental scrubber is maintained by feeding caustic soda or alkaline carbonates which is not depicted in the figure.

When $SO_X$ present in the line 30 is low, sulfite generated in-situ in the environmental scrubber O may not be enough to deplete the unreacted ozone. A small feed of sodium sulfite, thiosulfate or reduced sulfur may also be fed to maintain sulfite concentration in the environmental scrubber necessary to deplete ozone.

The first inventive option is to treat the process gas exiting the waste heat boiler downstream of the SAR furnace at a low temperature (preferably less than 132° C.) to selectively oxidize $NO_X$ to higher water soluble oxides such as $N_2O_5$, which reacts with moisture in the flue gas to form nitric acid. Extensive testing at various facilities has indicated this technology does not oxidize $SO_2$ to generate any measurable amount of $SO_3$. The wet scrubber to remove fly ash and other particulate matter in the process gas stream also removes this oxidized form of $NO_X$, namely $N_2O_5$ and nitric acid. This option produces an $SO_2$ containing process gas that is substantially free from $NO_X$. Therefore, if this alternative is elected, the sulfuric acid product will not contain objectionable quantities of niter or nitrosyl sulfuric acid. Since an excess of ozone in the process flue gas stream is of little consequence in SAR processes, $NO_X$ levels as low as 2 ppm can be maintained with proper engineering and process controls. If the quencher is used upstream of the scrubber to reduce temperature of the flue gas, care must be taken to reduce or minimize water droplets in the ozone oxidation zone.

The second inventive option is to treat the process flue gas exiting the candle mist eliminator. The $SO_2$ content of the flue gas varies from 50 to 2000 PPM depending on the plant design. This flue gas also contains some sulfuric acid mist, between 10 to 1000 ppm of $NO_X$, 4-12% $CO_2$, and the remainder oxygen and nitrogen. $NO_X$ can be selectively oxidized to $N_2O_5$ and nitric acid vapor by mixing ozone into the flue gas. An environmental scrubber with aqueous solution of caustic soda or alkaline carbonate/bicarbonate recirculation can reduce substantially both $SO_X$ and $NO_X$ at the same time prior to exhausting flue gas to the stack. To neutralize nitric acid, there will be a slight increase in the consumption of scrubber alkali.

Both options depicted above are capable of delivering a wide range of desired $NO_X$ removal efficiencies with large variations in process conditions and irrespective of increase in feed nitrogen oxides or load swings. Accordingly, the present invention can be used either to treat process or flue gas for quality/environmental compliance (first option) or solely for environmental compliance (second option).

As seen in the above example, there is no new equipment to be added and existing equipment can be modified or retrofitted with $O_3/O_2$ injection skid.

The cost impact of such a $NO_X$ control solution is a small fraction of the benefit that could be achieved by $O_2$ enrichment.

Figure 4:
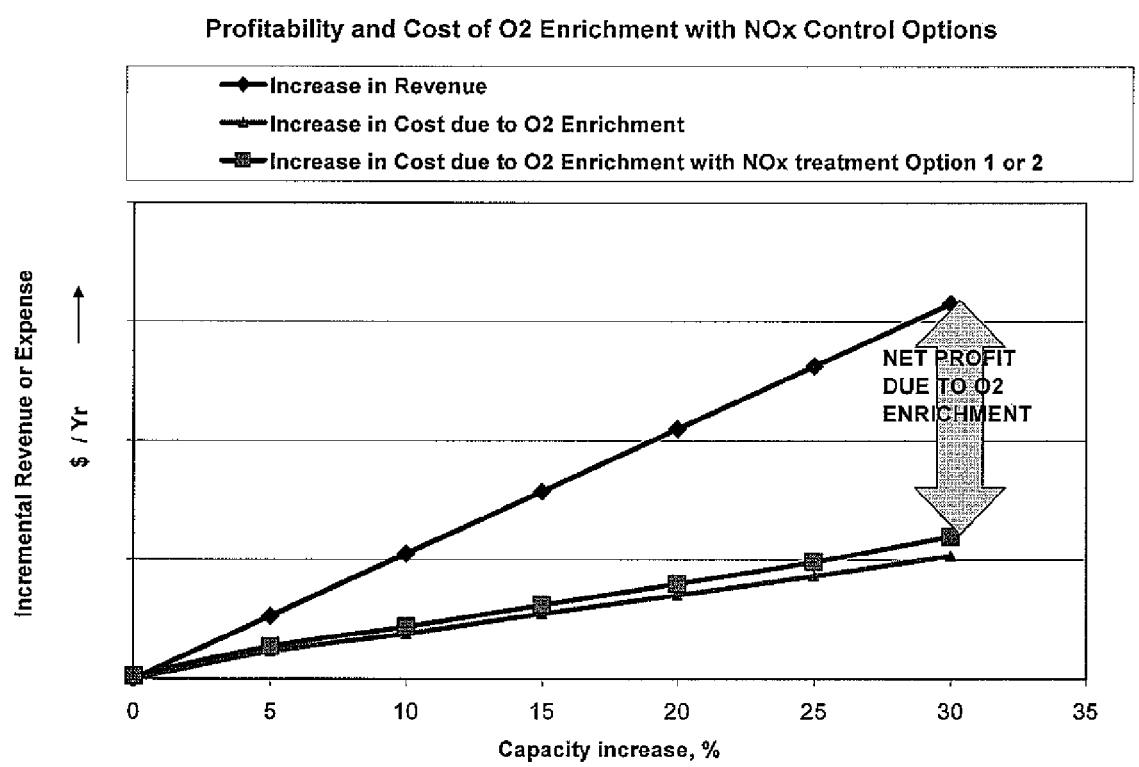
FIG. 4 is a graph representing the increase in revenue versus capacity increase in oxygen enrichment.

FIG. 4 depicts a clear representation of incremental revenue due to capacity enhancement including increased operating costs.

While this invention has been described with respect to particular embodiments thereof it is apparent that numerous other forms and modifications of the invention will be obvious to those skilled in the art. The appended claims in this invention generally should be construed to cover all such obvious forms and modifications which are within the true spirit and scope of the invention.

Having thus described the invention, what we claim is:

1. A method for removing contaminants from a waste gas stream in a sulfuric acid production process comprising the steps:
    a) contacting said waste gas stream with ozone;
    b) directing said waste gas stream to a particulate scrubber;
    c) directing said waste gas stream to a gas dryer; and
    d) recovering said waste gas stream.

2. The method as claimed in claim 1 wherein said waste gas stream is from a waste heat boiler.

3. The method as claimed in claim 1 wherein said ozone is injected into said waste stream in an amount up to 10 percent by weight ozone.

4. The method as claimed in claim 1 wherein said ozone is injected a pressure of up to 25 psig.

5. The method as claimed in claim 1 wherein said waste gas stream contains sulfur dioxide, nitrogen oxides, fly ash and particulates.

6. The method as claimed in claim 1 wherein said ozone converts said nitrogen oxides to $N_2O_5$ and nitric acid.

7. The method as claimed in claim 1 wherein said particulate scrubber removes said fly ash, particulates, $N_2O_5$ and nitric acid from said waste gas stream.

8. The method as claimed in claim 1 wherein said gas dryer removes water from said waste gas stream.

9. The method as claimed in claim 1 wherein said recovered waste gas stream is directed to a catalyst bed and sulfuric acid absorption tower.

10. The method as claimed in claim 1 wherein said waste gas stream is at a temperature of 135° C. or less.

11. The method as claimed in claim 1 wherein sulfite is added to said scrubber.

12. The method as claimed in claim 1 further comprising injecting oxygen into a furnace of said sulfuric acid production process.

13. A method for removing contaminants from a gas stream from a candle mist eliminator in a sulfuric acid production process comprising the steps:
   a) contacting said gas stream with ozone;
   b) directing said gas stream to an environmental scrubber; and
   c) recovering said gas stream.

14. The method as claimed in claim 13 wherein said ozone is injected into said gas stream in an amount up to 10 percent by weight ozone.

15. The method as claimed in claim 13 wherein said ozone is injected a pressure of up to 25 psig.

16. The method as claimed in claim 13 wherein said 1 gas stream contains sulfur dioxide, sulfuric acid, nitrogen oxides and carbon dioxide.

17. The method as claimed in claim 13 wherein said ozone converts said nitrogen oxides to $N_2O_5$ and nitric acid.

18. The method as claimed in claim 13 wherein said environmental scrubber removes said sulfur oxides and $N_2O_5$ and nitric acid from said gas stream.

19. The method as claimed in claim 13 wherein said gas stream is at a temperature of 135° C. or less.

20. The method as claimed in claim 13 wherein said recovered gas stream is vented to the atmosphere.

21. The method as claimed in claim 13 wherein sulfite is added to said scrubber.

22. The method as claimed in claim 13 further comprising injecting oxygen into a furnace of said sulfuric acid production process.

23. A method for producing sulfuric acid comprising the steps:
   a) recovering a gas stream from a sulfuric acid recovery furnace;
   b) directing said gas stream to a particulate scrubber;
   c) injecting ozone into said gas stream prior to it entering said particulate scrubber;
   d) directing said scrubbed gas stream to a gas drying tower;
   e) directing said dried, scrubbed gas stream to a catalyst bed to convert sulfur dioxide present in said dried, scrubbed gas stream to sulfur trioxide;
   f) directing said gas stream containing sulfur trioxide to a sulfuric acid absorption tower; and
   g) recovering sulfuric acid.

24. The method as claimed in claim 23 wherein said ozone is injected into said gas stream in an amount up to 10 percent by weight ozone.

25. The method as claimed in claim 23 wherein said ozone is injected a pressure of up to 25 psig.

26. The method as claimed in claim 23 wherein said gas stream contains sulfur dioxide, nitrogen oxides, fly ash and particulates.

27. The method as claimed in claim 23 wherein said ozone converts said nitrogen oxides to $N_2O_5$ and nitric acid.

28. The method as claimed in claim 23 wherein said particulate scrubber removes said fly ash, particulates, $N_2O_5$ and nitric acid from said gas stream.

29. The method as claimed in claim 23 wherein said gas dryer removes water from said gas stream.

30. The method as claimed in claim 23 wherein said catalyst bed comprises one or more catalyst beds.

31. The method as claimed in claim 23 wherein said catalyst bed contains $V_2O_5$.

32. The method as claimed in claim 23 wherein environmental scrubber uses a caustic scrubbing solution.

33. The method as claimed in claim 23 wherein said gas stream is at a temperature of 135° C. or less.

34. The method as claimed in claim 23 wherein sulfite is added to said scrubber.

35. The method as claimed in claim 23 further comprising injecting oxygen into said sulfuric acid recovery furnace.

* * * * *

UNITED STATES PATENT AND TRADEMARK OFFICE
CERTIFICATE OF CORRECTION

PATENT NO. : 7,632,475 B2
APPLICATION NO. : 11/971948
DATED : December 15, 2009
INVENTOR(S) : Suchak et al.

It is certified that error appears in the above-identified patent and that said Letters Patent is hereby corrected as shown below:

On title page

Item (75) Inventors delete the name "Robert Aeiss" and insert the name -- Robert Zeiss --

Signed and Sealed this

Second Day of February, 2010

David J. Kappos
*Director of the United States Patent and Trademark Office*